United States Patent Office 3,786,155
Patented Jan. 15, 1974

3,786,155
SULFUR CONTAINING FUNGICIDAL COMPOSITIONS AND METHODS OF USE
Gilbert Cousserans, Portet-sur-Garonne, and Francois Mathey, Robert Scuflaire, and Oleg Gryszkiewic-Trochimowski, Ballancourt, France, assignors to Azote et Produits Chimiques S.A., Toulouse, France
No Drawing. Filed Sept. 8, 1970, Ser. No. 70,600
Claims priority, application France, Sept. 8, 1969, 6930409
Int. Cl. A01n 9/12
U.S. Cl. 424—301                                                     8 Claims

ABSTRACT OF THE DISCLOSURE

Compositions comprising as an active ingredient a compound of the formula $$(\text{iso-}C_3H_7)O-COS-(CH_2)_n-SOC-O(\text{iso-}C_3H_7)$$

wherein $n$ is 0 or 1 are useful in the prevention or cure of fungal infections, e.g., Botrytis cinerea, in plants and for combatting noxious insects, e.g., flies, cockroaches and ants.

BACKGROUND OF THE INVENTION

This invention relates to novel compositions having pesticidal, more particularly fungicidal and insecticidal activity and to their use for the prevention and treatment of fungal infections on plants and for combatting insects.

SUMMARY OF THE INVENTION

According to this invention, fungal infections of plants are prevented or treated and insects are combatted employing compositions comprising a compound of the formula $$(\text{iso-}C_3H_7)O-COS-(CH_2)_n-SOC-O(\text{iso-}C_3H_7) \quad (I)$$

wherein $n$ is 0 or 1.

DETAILED DISCUSSION

In the above formula, when $n=0$ the active compound is the carboxyisopropyldisulfide. To prepare this compound, sulfur dichloride is made to react on an alkali-metal isopropylthiocarbonate, preferably the potassium salt, according to the following reaction:

$$2(\text{iso-}C_3H_7)O-COSK+SCl_2 \rightarrow (\text{iso-}C_3H_7)O- \\ COS-SOC-O(\text{iso-}C_3H_7)+S+2KCl$$

The reaction is performed in an organic solvent which does not react with the sulfur dichloride, for example, tetrahydrofuran. The reaction temperature should not be higher than 0° C., e.g., preferably between −10 and −5° C. During the mixing of the reagents, a strong rise in temperature should be avoided, either by adding the sulfur dichloride progressively or, preferably, by applying external cooling. When the reaction is over, the precipitated alkali-metal chloride is separated, for example, by filtration, and the solvent is removed from the filtrate.

It may also be convenient to use a known method for the preparation of carboxyalkylpolysulfides which consists in treating the alkali-metal alkylthiocarbonate corresponding to the desired polysulfide with iodine in an alcoholic solution. However, this known method has the drawbacks of producing only low yields of a product having a high proportion of impurities. According to a preferred embodiment of that reaction, the selectivity is improved by operating at lower temperature, for example, at −50° C., and by using a silght excess of iodine, said excess being separated when the reaction is over by any known method, for example, by reaction with mercury.

According to another known method, gaseous chlorine or bromine vapors are reacted with an alkali-metal isopropylthiocarbonate solution, U.S. Pat. 2,375,083.

The raw product thus obtained is a yellow liquid which may contain a low proportion of sulfur as impurity. This raw product can be used as such in pesticidal compositions or it may be purified by the action of a solvent, e.g., petroleum ether and/or by distillation.

The thus-purified carboxyisopropyldisulfide is a slightly yellow liquid under normal conditions of temperature and pressure. It is substantially insoluble in water but soluble in the usual organic solvents, petroleum ether included.

In the above-given formula wherein $n=1$, the compound is S-methylene bis(O-isopropylthiocarbonate). This compound can be prepared by reacting methylene iodide with an alkali-metal isopropylthiocarbonate, preferably the potassium salt. The reaction is performed in an inert solvent, e.g., anhydrous tetrahydrofuran or absolute isopropylic alcohol, at room temperature or slightly higher than room temperature, for example, at 30–50° C., which permits a shorter reaction time.

This compound is a colorless liquid under normal temperature and pressure conditions. It is substantially insoluble in water but can be dissolved in usual organic solvents, including petroleum ether.

Although the above compounds, impure or purified, can be used alone as pesticidal compounds, they are most often and preferably used in admixture with a solid or liquid diluent or carrier.

In preparation of the solid pulverulent or particulate pesticidal compositions comprising a compound of Formula I, the liquid active component is absorbed or adsorbed in and on an inert carrier, e.g., talc, clay, diatomaceous earth, sulfur, and the like. This step is usually followed by a drying step in order to remove the solvent or other liquid diluent of the active component. A reagent which improves adhesivity, such as lignosulfonates, glycerophthalic resins and the like can also be added to said composition.

The liquid pesticidal compositions are generally in the form of aqueous emulsions. In this case the compositions contain the active component preferably dissolved in a suitable non-toxic organic solvent and emulsifying agent, e.g., an alkylbenzenesulfonate, fatty acid ester or polyalkylene glycol. There is preferably also included a reagent which improves the adhesivity, as described above. One may also add a reagent which will improve the spraying characteristics, e.g., quaternary ammonium salts, amines, proteinic compounds, fatty acid soaps, and the like.

Surface active agents can be used not only to emulsify the active ingredient when dissolved in an organic solvent but also to suspend or disperse it in water.

Surface active agents also increase the effectiveness of the active ingredient. Examples of such surface active agents are sodium oleate, modified ammonium fatty acid compounds, decaethylene glycol mono-p-(1,1,3,3-tetramethylbutyl) phenyl ether, tetraethylene glycol monoakyl and dialkyl ether, and octaethylene glycol monoalkyl ethers.

Aqueous suspensions can be prepared with the aid of sodium salts of higher alkyl sulfates, sulfonated ethyl oleate, sodium sulforicinoleate, arylalkyl polyethers, polyoxyethylene ethers of dialkyl phenols, and propylene glycol monoesters of coconut-oil acids. Concentrated pastes that can easily be diluted can be prepared using, e.g., diluted water-soluble colloids, e.g., polyvinyl alcohol, methylcellulose, petroleum sulfonates, lignin sulfonates and alkyated benzenesulfonates. Kerosene based formulations can be prepared using, e.g., sodium dodecyl sulfate or polyoxyethylene sorbitol mixed fatty acid ester. Hydrophobic compositions can be prepared using, e.g., stearylamine with calcium phosphate (U.S. 2,430,288).

Other emulsifiers which can be used for formulating insecticides include alkylaryl mono-, di- and trisulfonates, sodium lauryl sulfates, sulfates of higher secondary alcohols, fatty acid esters of poymerized glycols, fatty acid sorbitan esters. (See U.S. 2,509,233; 2,560,626.) An example of a cationic emulsifier is diethyloctadecyl-p-tolylammonium ethyl sulfate.

Cationic emulsifiers can be used to produce unstable oil-in-water emulsions, which break on contact with the negatively charged foliage, e.g., trimethyloctadecylammonium bromide, fatty acylated nitrogen bases, triethylhexadecylphosphonium bromide, and ternary sulfonium salts (U.S. 2,418,652). Emulsions can be prepared by adding cationic surface agents to an emulsion of the active compound emulsified with anionic or nonionic surface active agents. Examples of the cationics are maleates of the carboxylic amides [condensation products of fatty acids with 1-(hydroxyethylamino)-2-aminoethane] and quaternary chlorides of N-(diethylaminoethyl)oleamide.

In the case of insecticidal compositions, the active component can also be dissolved in a usual solvent having suitable viscosity and volatility. Such an organic solution can additionally contain a reagent which improves the dispersion characteristics, as described above.

An organic solvent can also be used to prepare concentrated herbicidal compositions which are to be dispersed in water prior to use. In such instances, a dispersing and/or emulsifying agent is also preferably present.

Whatever form of carrier is chosen, the concentration of the active component of the pesticidal composition therein can vary over a wide range, for example, between 0.01 and 90%, preferably between 0.1 and 50%, of the total weight of the composition. The effective dosages of active compound applied to the situs being treated are quite low, as shown by the experiments performed by applicant, e.g., between 50 and 500 mg., or higher, preferably between 100 and 300 mg. per cubic meter of treated volume for insecticidal compositions. For fungicidal compositions, the active compound concentration in the pesticidal composition preferably is between 0.01 and 5%, or higher, preferably between 0.05 and 0.5%. In any case, for curative or preventive treatment against parasitic fungi, there is applied to a locus susceptible to fungal growth an amount of a composition containing the active compound which is effective to inhibit fungal growth.

The active compounds of this invention are non-toxic to human beings and animals at the concentrations employed and no phytotoxic effect has been observed on plants within the above-given ranges of concentration.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Example 1

To prepare carboxyisopropyldisulfide, potassium isopropylthiocarbonate (94.8 g.) was dissolved in 750 ml. of anhydrous tetrahydrofuran. Into this solution was poured while cooling to between $-10$ and $-5°$ C., a cooled mixture of sulfur dichloride freshly distilled (30.9 g.) and 100 ml. of anhydrous tetrahydrofuran. The mixture was left 10 hours at room temperature, while being agitated. The crystals (of potassium chloride and sulfur) which precipitated were filtered off and the solvent was removed at room temperature under reduced pressure. The liquid remaining in the flask, which still contained sulfur crystals, was treated with petroleum ether at 45° C. The remaining sulfur crystals were removed and the remaining composition was heated over a water-bath under a pressure of 0.2–0.3 mm. Hg in order to remove the fraction distilling at 40–45° C. There was collected 40.6 g. of impure product containing 28.8% sulfur which, after two successive distillations, gave 29.5 g. of a slightly yellow liquid having the following characteristics: percent S found 28.8 (percent S calculated 26.89); boiling point 72–73° C. under 0.3 mm. Hg; refractive index 1.4841. This compound has been tested for its pesticidal effectiveness.

With this compound a first series of tests were performed to determine its insecticidal effectiveness. Glass cylinders 30 cm. high and having a useful capacity of approximately 6 liters were used. Each cylinder was provided with a lower pipe for introducing the insects. The cover of each cylinder was perforated to permit a slight aeration. To allow for the survival of the insects during the experiment, on the bottom part of each cylinder was laid a sheet of filter paper on which was placed a lump of sugar and a small dish containing cotton-wool soaked with distilled water.

Before putting the sugar and soaked cotton-wool inside the cylinder, 4–5 ml. of carboxyisopropyldisulfide dissolved in acetone were sprayed into the cylinder. The solvent was allowed to evaporate and 15 flies (*Musca domestica*) were then introduced in the apparatus.

Fo reach test, a blank batch was also observed, as well as, for comparison, a group of flies treated with "lindane," a known insecticidal compound containing hexachlorocyclohexane-$\alpha$ as the active component. The results showed that all flies were paralyzed after about 30 minutes and fell to the bottom of the cylinder. No fly survived after 24 hours when using 150 mg./m.$^3$ of carboxyisopropyldisulfide. In order to obtain the same result, there must be used 200 mg./m.$^3$ of "lindane".

A second series of tests was performed to determine the effectiveness of this compound on more resistant insects, such as cockroaches and ants. For these tests there were used vats having a useful capacity of 42 liters. The composition containing the disulfide in an acetonic solution was sprayed on the bottom of these vats at various concentrations, each spraying operation using 5 ml. The surfaces were then left to dry and 30 cockroaches (germanic black-beetles) or 50 ants (*Formica rufa*) were introduced. The observations were made after 30 minutes, 2 hours, 6 hours, 8 hours and 24 hours. The tests were performed under daylight and at a temperature maintained in the vicinity of 22° C.

The results are summarized in the following table:

|  | Cockroaches | | Ants | |
| --- | --- | --- | --- | --- |
|  | 300 mg./m.$^3$ | 500 mg./m.$^3$ | 300 mg./m.$^3$ | 500 mg./m.$^3$ |
| 30 minutes | 0 P | 2 P | 20 P | 22 P |
| 2 hours | 2 P | 2 P; 2 D | 14 P; 16 D | 14 P; 14 D |
| 6 hours | 2 P; 4 D | 2 P; 16 D | 22 D; 4 P | 16 D; 2 P |
| 8 hours | 2 P; 6 D | 10 P; 16 D | 22 D; 4 P | 16 D; 2 P |
| 24 hours | 6 P; 10 D | 26 P | 22 D; 4 P | 44 D; 6 P |

NOTE.—P=insects paralyzed; D=insects dead.

Example 2

There were performed a series of tests in order to determine the fungicidal effectiveness of the compound prepared under the conditions of Example 1.

This disulfide was dissolved in 1 ml. acetone in the presence of 0.5 ml. Tween 80 (polyoxyethylene sorbitol monooleate) then dispersed in water in the required amount to form the emulsion at the desired concentration of active compound. The tests were performed on a phytopathogenic fungus cultivated in vitro over a synthetic nutrient medium.

The phytopathogenic fungus used in this test was *Botrytis cinerea* which is responsible for a very common plant disease. In particular, it attacks the young sowings and brings about the grey rot of bunches of grapes.

The culture medium had the following composition:

| | G. |
|---|---|
| Glucose | 20 |
| Peptone | 6 |
| Yeast extract | 1 |
| Corn steep | 4 |
| Sodium chloride | 0.5 |
| Magnesium sulfate | 0.5 |
| Potassium dihydrogenphosphate | 1 |
| Iron sulfate | 10 |
| Gelose | 25 |

Water, quantity necessary for 1 liter.

When all these elements were dissolved, the medium was filtered, the pH was adjusted to 6.5 by the addition of sodium carbonate, then the medium was put in several test tubes and sterilized by heating at 110° C. for 10 minutes.

The plant parasite was incubated at 26±1° C. The observations were made after 2, 4 and 8 days' culture, by determining the development of the inoculated media and comparing with untreated blanks.

At a concentration of 0.5% of active component, the emulsion completely inhibits the development of the fungus.

Example 3

To prepare S-methylene bis(O-isopropylthiocarbonate), 79 g. potassium isopropylthiocarbonate were mixed with 67 g. methylene iodide in 2000 ml. anhydrous tetrahydrofuran. This mixture was agitated for 38 hours at room temperature. The potassium iodide crystals which formed were filtered off and the solvent was then removed under reduced pressure. To purify this compound, it was dissolved in petroleum ether (fraction 30–35°), the potassium iodide crystals were filtered off, solvent was removed and the remaining fraction was distilled. The product obtained was a colorless liquid boiling at 146–147° under 15 mm. Hg pressure, containing 24.95% sulfur. This compound has been submitted to various tests to show its pesticidal effectiveness.

This liquid was dissolved in acetone in the presence of a small quantity of wetting agent (Tween 80) and then dispersed in distilled water using the conditions described in the foregoing example. Tests were performed in order to determine the effectiveness of this compound on fungi which degrade wooden materials, viz., *Poria vaporiara*, *Polystitus sanguineus* and *Coriolus versicolor*. The development of the first two fungi is completely inhibited by the use of a composition containing 0.1% active compound. For the third fungus, a concentration of 0.5% active compound inhibits its growth.

Example 4

The effectiveness of S-methylene bis(O-isopropylthiocarbonate) on cockroaches and ants was studied using conditions similar to those of Example 1.

The results are summarized in the following table:

| | Concentration of active compound, mg./m.³ | 30 min. | 2 hrs. | 6 hrs. | 24 hrs. |
|---|---|---|---|---|---|
| Cockroaches | 300 | 6 P | 2 P; 2 D | 4 P; 6 D | 2 P; 14 D |
| Do | 500 | 2 P | 2 P; 6 D | 6 P; 6 D | 2 P; 24 D |
| Ants | 300 | 14 P | 10 P; 2 D | 6 P; 8 D | 2 P; 48 D |
| Do | 500 | 6 P; 4 D | 8 P; 8 D | 12 P; 8 D | 50 D |

NOTE.—P=insects paralyzed; D=insects dead.

The following are illustrations of formulations suitable for use as fungicides.

(A) DISPERSION

| | Percent |
|---|---|
| Compound of Formula I | 45 |
| Carboxymethyl cellulose | 1 |
| Non-ionic wetting agent | 2 |
| Pulverulent solid | 1 |
| Water | 50 |

(B) DUSTING POWDER

| | Percent |
|---|---|
| Compound of Formula I | 15 |
| Powdered sulfur | 25 |
| Silica chalk | 60 |

A liquid kerosene-based formulation of compound of Formula I has also been prepared and its herbicidal effectiveness on such dicotyledones as nasturtium and white mustard has thus been demonstrated.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A fungicidal composition comprising as the active ingredient, a fungicidally effective amount of a compound of the formula $$(iso\text{-}C_3H_7)O\text{---}COS\text{---}CH_2\text{---}SOC\text{---}O(iso\text{-}C_3H_7)$$

and a carrier selected from the group consisting of an inert finely divided solid and a liquid containing a surface active emulsifying agent.

2. The composition of claim 1 wherein the surface active emulsifying agent is a cationic emulsifier capable of producing an unstable oil-in-water emulsion which breaks in contact with negatively changed foliage.

3. The composition of claim 1, wherein said active ingredient is a concentration of 0.01–90% by weight.

4. The composition of claim 1, wherein said active ingredient is in a concentration of 0.1–5% by weight.

5. The composition of claim 1, wherein said active ingredient is in a concentration of 0.05–0.5% by weight.

6. A method of controlling fungal growth, which comprises applying to the fungus a fungicidally effective amount of a compound of the formula $$(iso\text{-}C_3H_7)O\text{---}COS\text{---}(CH_2)_n\text{---}SOC\text{---}O(iso\text{-}C_3H_7)$$

wherein $n$ is 0 or 1.

7. The method of claim 6 wherein $n$ is 0.
8. The method of claim 6 wherein $n$ is 1.

References Cited
UNITED STATES PATENTS

| 2,375,083 | 5/1945 | Cooper | 260—455 |
|---|---|---|---|
| 2,615,804 | 10/1952 | Stewart et al. | 260—455 B X |
| 1,532,225 | 4/1925 | Caldwell | 260—455 B |

ALBERT T. MEYERS, Primary Examiner
L. SCHENKMAN, Assistant Examiner

U.S. Cl. X.R.

71—100; 260—455 B